No. 837,552. PATENTED DEC. 4, 1906.
J. E. ENNIS.
TUNNELING MACHINE.
APPLICATION FILED JUNE 15, 1905.

WITNESSES:
F. C. Gibson.
John T. Schrott.

INVENTOR
John E. Ennis
BY
Fred G. Dieterich & Co.
ATTORNEYS

No. 837,552. PATENTED DEC. 4, 1906.
J. E. ENNIS.
TUNNELING MACHINE.
APPLICATION FILED JUNE 15, 1905.

WITNESSES:
F. C. Gibson.
John D. Schrott.

INVENTOR
John E. Ennis
BY
Fred G. Dieterich & Co.
ATTORNEYS

No. 837,552. PATENTED DEC. 4, 1906.
J. E. ENNIS.
TUNNELING MACHINE.
APPLICATION FILED JUNE 15, 1905.

WITNESSES:
F. C. Gilson.
John J. Schrott.

INVENTOR
John E. Ennis
BY
Fred G. Dieterich & Co
ATTORNEYS

No. 837,552. PATENTED DEC. 4, 1906.
J. E. ENNIS.
TUNNELING MACHINE.
APPLICATION FILED JUNE 15, 1906.

WITNESSES:
F. C. Gibson
John D. Schott

INVENTOR
John E. Ennis
BY
Fred G. Dieterich
ATTORNEYS

No. 837,552. PATENTED DEC. 4, 1906.
J. E. ENNIS.
TUNNELING MACHINE.
APPLICATION FILED JUNE 15, 1905.
10 SHEETS—SHEET 8.

WITNESSES:
John D. Schrott,
F. C. Gilson.

INVENTOR
John E. Ennis
BY
Fred J. Dieterich & Co.
ATTORNEYS

UNITED STATES PATENT OFFICE.

JOHN E. ENNIS, OF CHICAGO, ILLINOIS.

TUNNELING-MACHINE.

No. 837,552.  Specification of Letters Patent.  Patented Dec. 4, 1906.

Application filed June 15, 1905. Serial No. 265,312.

*To all whom it may concern:*

Be it known that I, JOHN E. ENNIS, residing at Chicago, in the county of Cook and State of Illinois, have invented a certain new and Improved Tunneling-Machine, of which the following is a specification.

This invention relates to improvements in that class of boring or tunneling machines that dig a circular opening and in which the digging mechanism is coöperatively connected with a supporting means that carries a feed mechanism adapted under proper manipulation or adjustment to carry the machinery as a new portion of the tunnel is being cut and the previously-cut portion is lined up.

In its more specific nature my present invention seeks to improve the construction of tunneling-machine disclosed in my Patent No. 690,137, dated December 31, 1901, and comprehends generally the reduction of the operating parts, a more compact correlation thereof whereby the mechanism is rendered the more accessible, and in which an improved provision is made for the direction of the machine, whereby it can be perfectly accomplished without the use of the rear or supplemental portion required in my patented machine referred to.

To make the purpose of my present invention and the distinctive features over my former machine the more readily apparent, it should be stated that while the means disclosed in my patented machine for moving the machine forward—that is, by pulling all the small rails and then resting the actuating mechanism against the small rails to feed the digger-operating mechanism forward—in practice have been found generally effective, yet they fail to fully meet the desired requirements, since after a time the rollers on which the mechanism moves become rusted solid to their axes, and hence an excessive amount of power has been found necessary to operate the machine.

One of the objects of my present invention is to overcome the objection noted, and for such purpose I have designed an improved way of supporting the machine on the rails or shield in such manner that the friction is reduced to the minimum and in which the pushing forward of the machine, using the rails as a resting-point, which was accomplished in the patented machine by numerous screw-nuts, sprocket-wheels, clutches, idler-sheaves, gears, and clutch-shifters, in my present construction has been reduced to one feed-screw and nut, the screw acting as a gear revolving on rollers as the master-wheel, and the nut being in the nature of a ring that sets against all the rails the full size of the machine.

In my present construction the lead of the screw is large enough to admit of rollers between the thread of the screw and the ring-nut, thereby making the screw substantially antifriction on the side that is to do the heavy work, and this reduces the power required for operating proportionately to the efficiency of the screw to the power applied.

In my present construction of tunneling-machine the means for pulling the small rails are such that several hundred less pieces are required than is included in the like operating means in my patented machine.

Another feature of my present invention lies in the construction of the casing-ring that carries the master-wheel, the same being adjustably mounted and provided with two sets of adjusting-screws, one set screwing into the main frame and the other set pressing it away from the same, so the master-wheel, with the digging apparatus, can be set to dig up or down the same direction that the machine is pulling.

Again, in my present form of machine the drive-gearing is supported from above instead of on the floor, in such manner as to allow the conveyer to be set lower and a wider upper space to allow more distance for the buckets to empty onto the conveyer.

With the above objects in view my present invention in its subordinate features consists in certain details of mechanism and peculiar combination of parts, all of which will be hereinafter fully explained, pointed out in the claims, and illustrated in the accompanying drawings, in which—

Figs. 9 and 10 are cross-sections on lines 9 9 and 10 10 on Fig. 7 of the slide-rail hereinafter referred to. Fig. 15 is an end elevation, partly in vertical section, of the screw-gear that moves the machine forward. Fig. 17 is a longitudinal section of the tubular extensible socket hereinafter referred to. Figs. 18 and 18$^a$ are respectively a side elevation and a plan view of one section of the cages that support the antifriction-rollers that keep in proper relation the rollers of the master-wheel on the screw-gear-wheel supports. Fig. 19 is a transverse section thereof with one of the rollers in position. Fig. 22 is a side elevation of one of the cage-sections for the rollers that engage the screw-threads on the screw-thrust and gear members.

In my present construction of tunneling-machine the shield or supporting-frame is arranged substantially like the shield shown in my patent referred to, except in the present arrangement each shield-section is composed of nine small rails, operated between a series of tie-rails that connect the rail-guides, and the master-wheel is actuated to make twelve revolutions to operate the digging mechanism from the center to the circumference, and vice versa, and nine of the said revolutions is required to pull the nine small rails forward successively, one of the remaining revolutions of the master-wheel being utilized for pulling the machine and one revolution to draw the screw-thrust ring hereinafter described away from the small rails.

Figure 2:
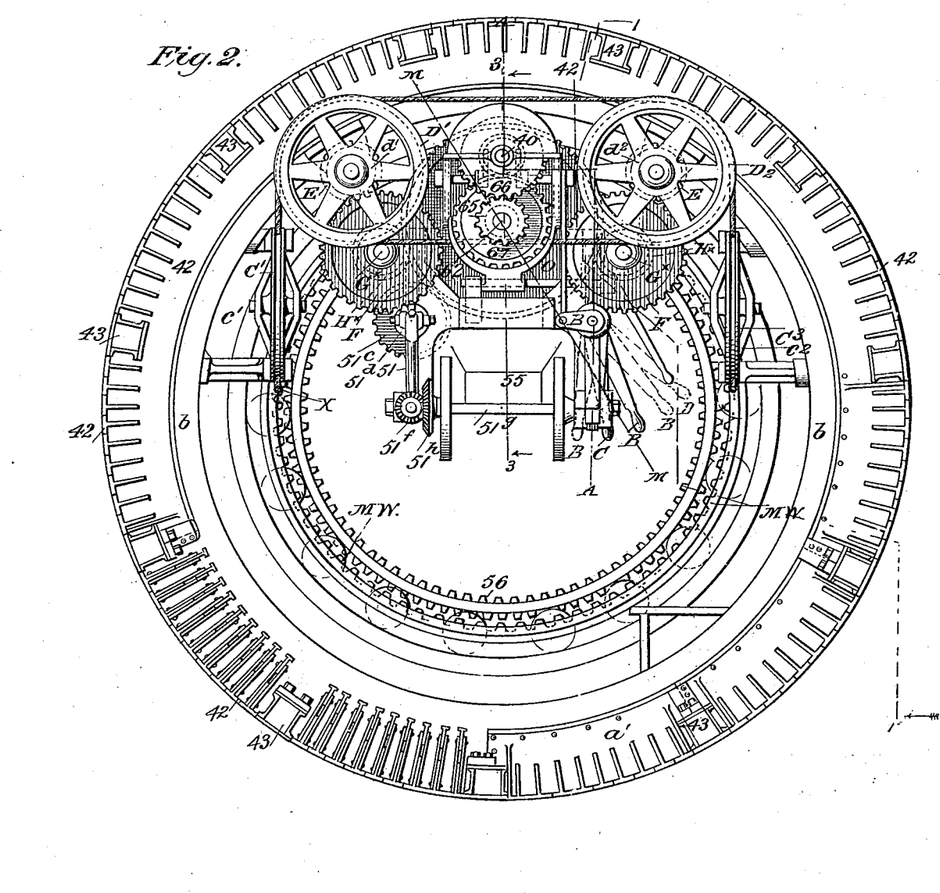
Fig. 2 is a transverse section of the tunnel, showing the mechanism therein in end elevation, the several controlling-levers being shown positioned in full and dotted lines for effecting the adjustments of the several submechanisms controlled thereby.

The shield consists of a series of T beams or rails 42, arranged equidistantly apart, as best shown in Fig. 2, and the said rails are slidably mounted in the radially-slotted guide-rings $a'$ $a^2$, that form a part of the front and back base-rings $b$ $b'$, on which the internal parts are mounted and which are rigidly joined by a series of tie-rails 43, one of which is located between each set of slide or creeper rails 42.

To make the construction and operation of my present invention clear, I shall now describe several parts, beginning at the entrant end thereof—that is, the end where the power is applied—and follow so far as possible the operative sequence of the different parts to the delivery or dirt-receiving end of the machine.

Figure 1:
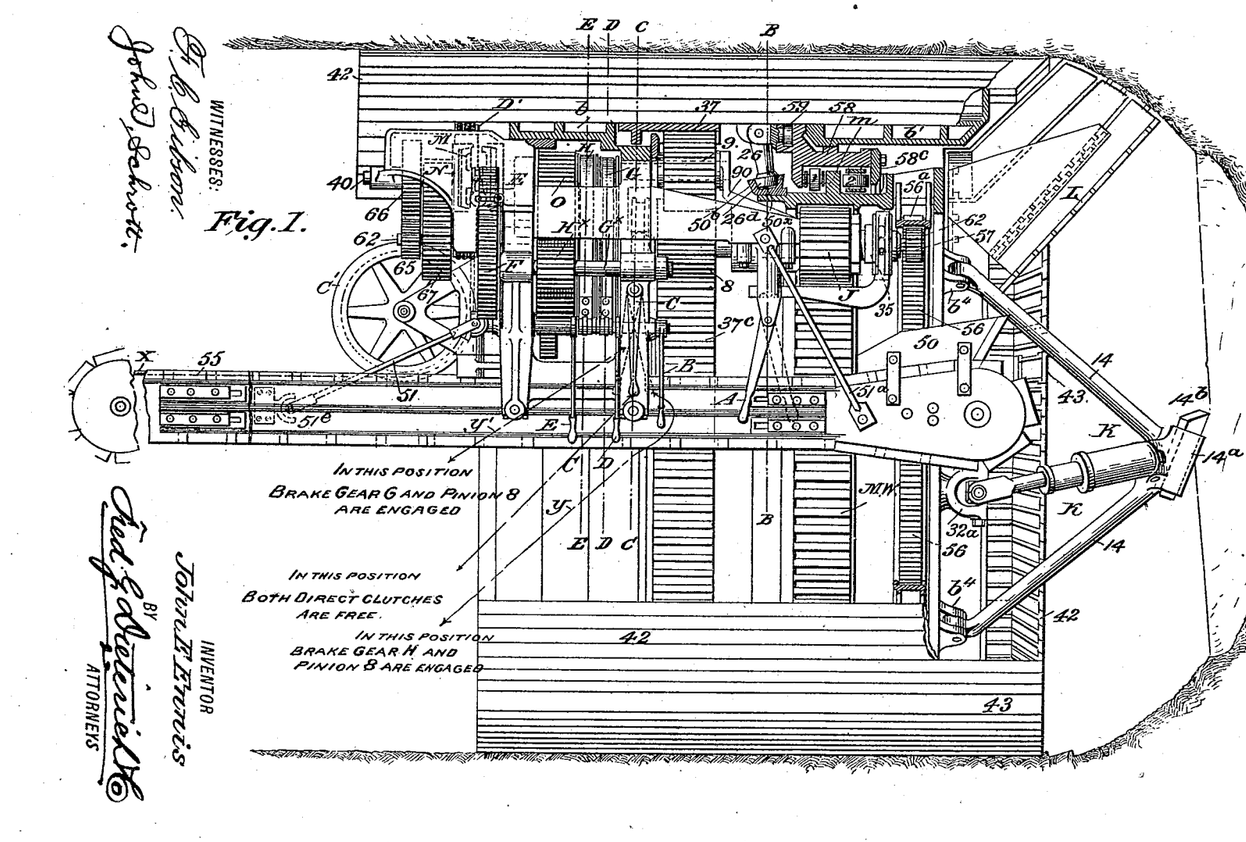
Figure 1 is a vertical elevation of my improved tunneling mechanism, showing the same in a tunnel cut or opening, parts being in section to the better illustrate the coöperative arrangement of the mechanism, the line of section being taken substantially on the line 1 1 on Fig. 2.

Referring now particularly to Figs. 1 and 2, the levers A, B, C, D, and E control the entire operating of the machine. X designates the drive-cable. That part coming from the power-house passes over a guide-sheave $C'$, disposed in the longitudinal plane of the tunnel, thence over a pair of sheaves $D'$ $D^2$, disposed at right angles to the sheave $C'$ and located near the top of the shield and one at each side of the vertical axis of the tunnel, over which the cable X makes four laps, (see Fig. 1,) and from whence the cable passes down over a guide-sheave $C^2$, disposed opposite the sheave $C'$, from which the cable X passes back to power-plant. The sheaves $C'$ $C^2$ are mounted in bracket-bearings $c'$ $c^2$, secured to the back base-ring $b$, and each of the sheaves $D'$ $D^2$ is mounted on sleeves $d'$ $d^2$, having gears E E that mesh with the larger gears F F, keyed to shafts $G^\times$ $G^\times$, suitably supported on the back rest $b$, below the axes of the wheels $D'$ $D'$.

Figure 3:
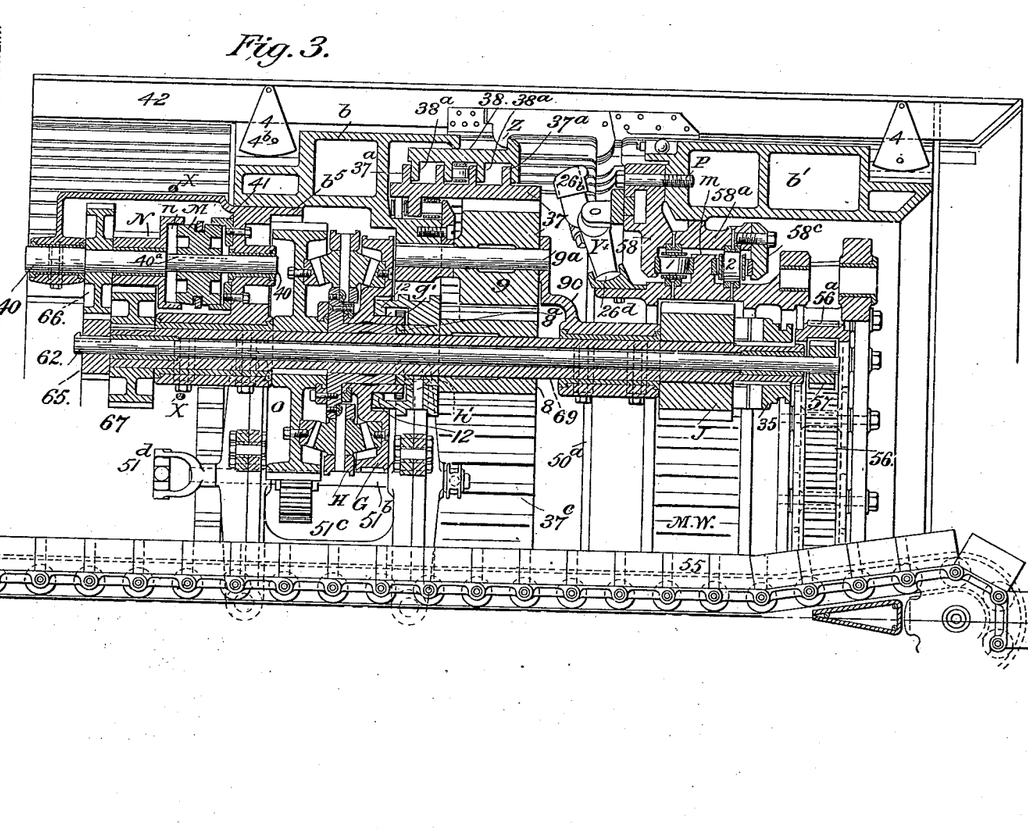
Fig. 3 is a central longitudinal section of the upper portion of my improved mechanism, taken practically on the line 3 3 of Fig. 2, the driver-cable and its drivers being omitted.

Each shaft $G^\times$ carries a pinion $H^\times$, and the pinions $H^\times$ $H^\times$ mesh with the centrally-disposed main drive-gear O, keyed on the main drive sleeve or shaft 69, upon which are loosely mounted the brake-band gears G and H, (best shown in Fig. 3,) by reference to which it will be also seen that on the said sleeve-shaft 69, in advance of the brake-band gears G and H, is loosely mounted a large drive-pinion 8, and at the rear or outer end is a drive-gear 67, fixedly mounted on a shaft 62 within the sleeve-shaft 69.

The several gears just referred to are put in operation by the several levers shown in Figs. 1 and 2, the full-line position of which designates their adjustment to allow every part of the machine at a stand except the main shaft sheaves and pinions that drive the same, the several levers referred to performing the work for which they are provided only when shifted to their dotted positions. Such adjustments I will now explain.

The lever A, when pulled to the position shown in dotted lines on Fig. 1, sets a clutch 35, slidably mounted on the outer end of sleeve 69 into engagement with a drive-gear J, loosely mounted on sleeve 69, which meshes with the internal gear-rim of the master-wheel M W, on which the digger mechanism is mounted, and which includes a screw-operating gear-annulus 56, actuated by a pinion 57, keyed to the front end of the drive-shaft 62, rotatable within the sleeve-shaft 69, presently again referred to.

The digging mechanism (designated generally by K in my present invention) is made to take a spiral cut from the center to the circumference and from the circumference to the center by setting the controlling-lever C to the position indicated by dotted lines shown on Fig. 1, one position, $y$, being for setting the digger devices to cut from the center to the circumference and the other, $y'$, for cutting from the circumference to the center. This is performed in the first instance by setting a clutch M, keyed by a feather $40^a$ to a short shaft 40, longitudinally mounted in the rear end of the machine above the shafts 69–62 and adapted to engage with a clutch-face $n$ on a pinion N, (see Fig. 3,) loosely mounted on the said shaft 40 and held in mesh with the gear 67, fixedly held on the main sleeve-shaft 69, whereby to impart revolution to shaft 40 and take motion to the gear 66 on said shaft 40, held in mesh with a pinion 65, keyed to shaft 62 to drive the same, and through pinion 57 on the front end of said shaft 62 to impart motion to the drive-annulus 56 (which is also provided with external gears $56^a$) and to cause the same to revolve in the same direction of shaft 62, the parts being correlatively so arranged and combined to cause the annulus 56 to make two revolutions to one revolution of the master-wheel M W, which carries the said annulus 56.

The external teeth $56^a$ of the gear 56 mesh with a pinion $x$, keyed to the yoke-shaft 32, suitably mounted in bearings that form part of the master-wheel frame and which, in its connection with the yoke $32^a$ and the screw-feed devices presently described, forms a universal joint and turns the screw that forms a part of the screw-arm at a speed, which, in connection with the lead of the screws, will cause the digging mechanism to travel from circumference to center in twelve revolutions of the master-wheel.

Now in setting the lever B to an opposite dotted position from that before referred to it will shift clutch M so it coacts with a clutch-face 41, which is a fixed part of the stationary hanger or frame portion $b^5$, that has bearings for the shaft 40 and the front end of the shaft 69. The said adjustment of the clutch M will hold shaft 40 from revolving and likewise hold the train of gears controlled thereby and cause the internal and external toothed annulus 56 to stand still while the master-wheel carries the digger mechanism around to cause the gear $x$ to turn the screws of the screw-arm in the opposite direction, and thus actuate said digger mechanism to travel from the center to the circumference in twelve revolutions of the master-wheel M W.

With the lever B in the position shown in full lines with the clutch M at central position, the gear-annulus 56 being much harder to turn than the small gears that drive it, said annulus will turn the small gears and follow the speed of the master-arm, and hence not turn the screws of the screw-arm that actuates the digger, and thus cause the digger to follow the same path until the lever B is shifted again to either of its dotted positions.

Figures 15, 17, 18, 18A, 19, 22:
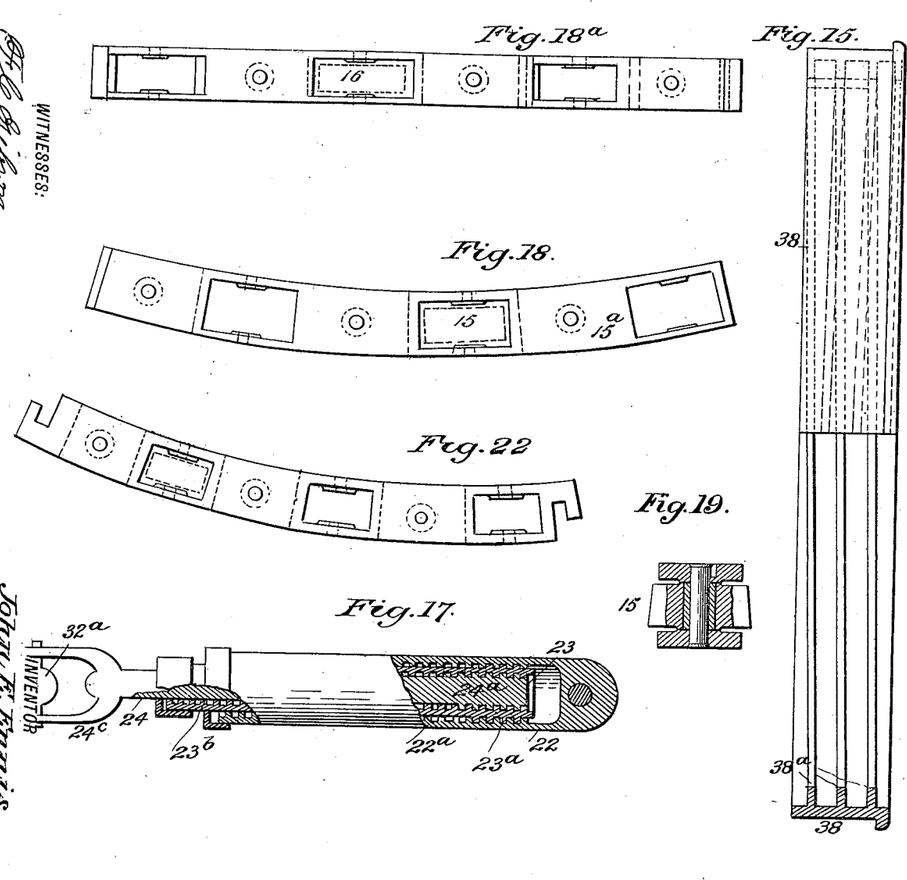

The digger devices, which are illustrated in detail in Figs. 1 and 17, are substantially like those shown in my patent referred to, and comprise generally the divergingly-disposed arms 14, pivotally connected at their inner ends to the bifurcated bearings $b^4$ $b^4$ on the front side of the master-wheel frame, which merge at their outer end into a casket $14^a$, adapted to receive the digger-bit $14^b$.

The bit-carrying socket is swung to or from the center by the screw-arm before referred to, which comprises the tubular socket 22, pivotally connected to the bit-holder or socket-head $14^a$, and having internal screw-threads $22^a$, with which engage the external screw-threads $23^a$ on the tubular shank 23, which is also formed with internal screw-threads $23^b$ to receive the threaded end $24^a$ of the bar 24, that terminates in a yoke $24^c$ with the universal joint $32^a$, as shown.

By reason of the peculiar construction of the digger-bit-holding means and the actuating mechanism coöperatively connected therewith the annulus 56 is revolved twice as fast as the master-wheel, thereby determining the direction of the pinion $x$, which in the practical construction of my machine revolves twelve thousand nine hundred and twenty-two times as rapidly as the master-wheel when the annulus 56 is revolving twice as fast, and the revolution of the pinion or gear $x$ revolves yoke-shaft 32, which causes the feed-screw $24^a$ on the rod 24 to gradually swing out the bit or shovel carrier as it is being swung around in a circle with the master-wheel, at the same time causing the digger bit or shovel to travel spirally inward or outward, according to the set of the lever B.

Having now described the general construction of the machine and particularly the means for actuating the digger mechanism, I shall now describe the means for moving the machine forward, which forms one of the main essentials of my invention.

Figure 16:
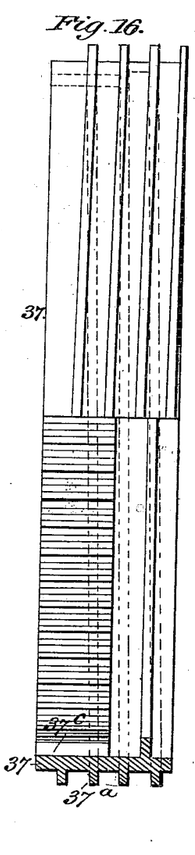
Fig. 16 is a similar view of the screw-gear annulus that coöperates with the said actuating-screw gear.
Figure 20:
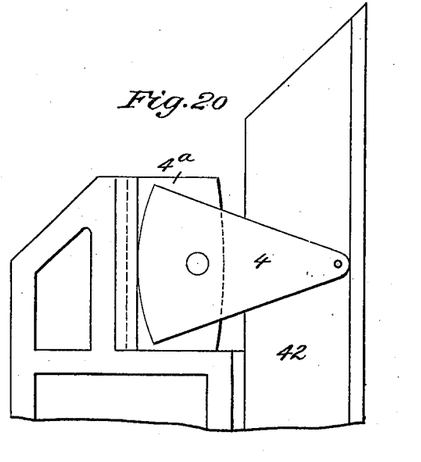
Fig. 20 is a detail side view of the rail-bearing members 4 and the bearings therefor.

37 designates what I term the "screw-gear," and the same is shown in detail in Figs. 15 and 16 and consists of an annular rim of a diameter nearly that of the back-rest $b$. On the external face it has a left-hand screw-thread $37^a$, the webs of which are spaced apart sufficiently to allow for the engagement therewith of the internal screw-thread $38^a$, formed on the screw-thrust member 38, which is an annulus that encircles the screw-gear 37 and for the reception of antifriction-rollers 15 and 16, one set 15 of which is arranged to form antifriction-bearings between the periphery of member 37 and the internal face of the member 38, while the other set 16 is arranged at right angles to the rollers 15 between the internal screw-webs $38^a$ and the external screw-webs $37^a$, said rollers 15 and 16 serving to reduce the friction between the working faces of the members 37 and 38 to the minimum, and the rollers 15 and 16 are mounted in cages $15^a$ and $16^a$, one of which is shown in detail in Fig. 18, their working positions being shown in Fig. 1.

The screw-gear 37 has a wide internal gear-rim $37^c$, which engages a pinion 9, loosely mounted on a short stationary shaft $9^a$, held rigidly journaled in a bracket-bearing 90, that forms a part of the front end of a bearing-bracket of a hanger suspended from the back-rest $b$, and the said pinion 9 meshes with and receives motion from gear 8 and imparts motion to the gear 37, and this operation is effected at predetermined times by the proper adjustment of levers C and D, which is done as follows: Lever C coöperates with the brake-band gears G and H by shifting the gear 8 to cause its clutch-face $8^a$ to engage the opposing clutch-face $h'$ of the brake-band H, (see Fig. 3,) which is done when the lever C is at the dotted position on Fig. 1. After the parts are thus adjusted by lever C lever D is pulled over to the dotted line (see Fig. 2) to hold the brake-band gear G from turning, and when the said brake member G is thus fixedly held the brake member H will revolve in the same direction that drive-gear O does, but at half its speed, and the said gear H being now clutched with pinion 8 will cause the same to revolve the intermediate pinion 9, which engages with the internal gear-rim of the screw-gear 37, the threads $37^a$ in the outside engaging the internal threads of the screw-thrust ring-flange $38^c$ will be pressed against the small rail-dogs Z, and by reason of the threaded arrangement of the members 37 and 38 push the machine forward the distance the operator may deem proper for the cut on the material engaged. The machine thus set, the lever D is pulled back to the position shown in full lines, and lever C is pulled back to the opposite dotted position, (see Fig. 1,) which puts the pinion 8 and brake-gear G into a clutched engagement by reason of the clutch end 12 on pinion 8 now engaging the clutch-teeth $g'$ on the front end of the hub $g'$ of gear G. The lever E is then manipulated to hold brake-band H at a standstill, which permits the brake G to now revolve in the opposite direction to drive gear O and at the same speed the gear O travels, and being now clutched to pinion 8 will cause the same to revolve the intermediate pinion 9, which pinion then imparts motion to the screw-gear 37 in a direction to draw the screw-thrust ring 38 away from the rail-dogs Z, and thereby allow small rails to be again drawn forward in the manner presently explained.

As before stated, it requires twelve revolutions of the master-wheel to operate the digging mechanism from center to the circumference. Nine of these revolutions are also utilized for moving the small shield-rails forward, and this is accomplished by the mechanisms best shown in Figs $12^a$, $12^b$, $12^c$, and Figs. 5, 6, and 7, by reference to which it will be noticed that the front rest $b'$ includes an annular rim 58, which is rigidly bolted to the front-rest frame $b'$ and includes a horizontal portion $58^a$, that forms a bearing for the antifriction-rollers 1 and 2, mounted in cages $1^a$ and $2^a$, located between the end flanges $58^b$ and $58^c$ of the member 58 and a central peripheral rim $m$ on the master-wheel M W.

On the rear face the rim 58 has an annular T-shaped groove 59, in which is slidably fitted an annular supporting-plate 26, from which project a series of rail-shifting levers Y, one for each section of rails 42 42 and all constructed alike except one, Y', which has a special construction presently explained.

Figure 5:
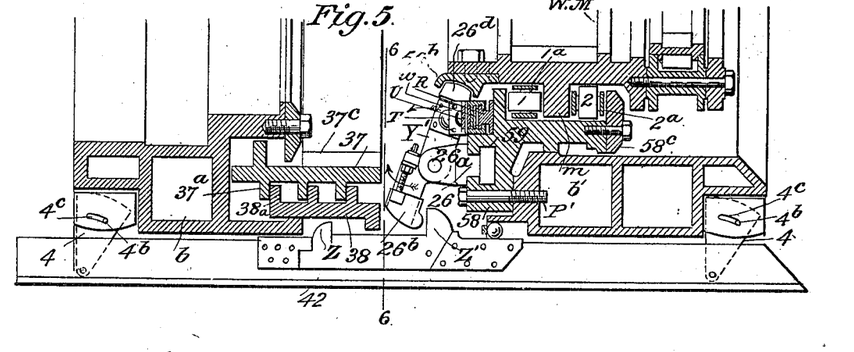
Fig. 5 is a detail longitudinal section of the lower portion of the digger mechanism, showing the same as moved forward with respect to the rail-shield and the shield-actuating lever swung to its maximum rearward position and ready to move the shield-rails forward when actuated by the cam on the master-wheel, said section being taken practically on the line 5 5 of Fig. 6.
Figures 6, 7:
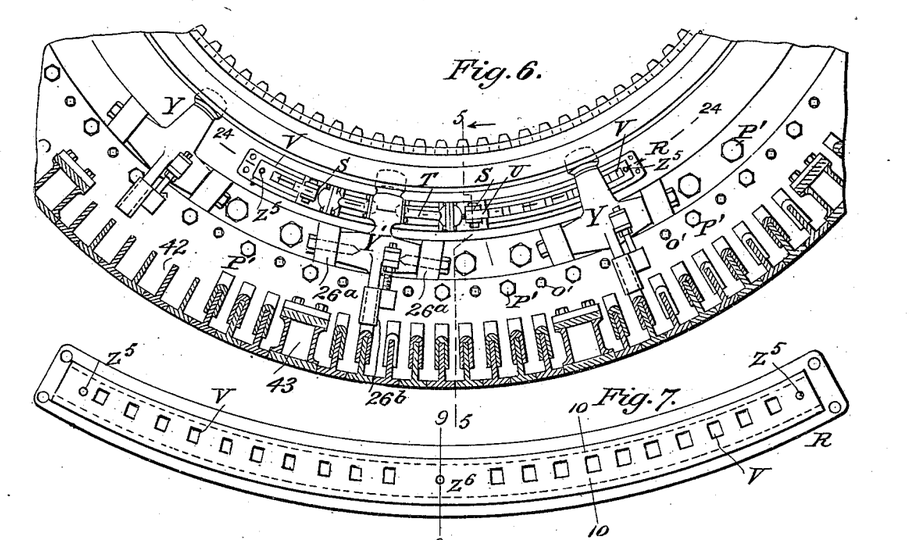
Fig. 6 is a transverse section of the parts shown in Fig. 5 on the line 6 6 of Fig. 5.
Fig. 7 is a face view.
Figure 8:
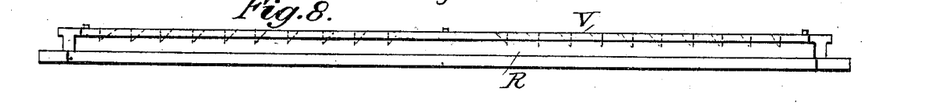
Fig. 8 is a plan view.
Figure 9:
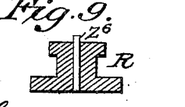
Figure 10:
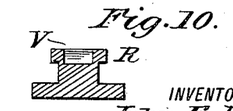
Figure 11:
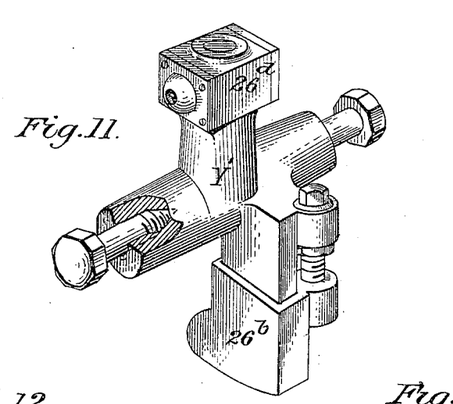
Fig. 11 is a perspective view of the special rail-lever that coacts with the slide-rail.
Figure 12:
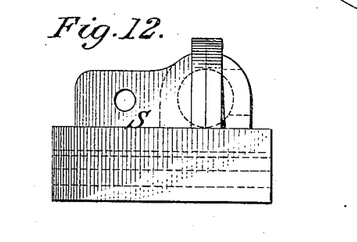
Figs. 12, 12$^a$, 12$^b$, and 12$^c$ are respectively side, top, and end views of the sliding pawl-carrying block connected to the special rail-lever.
Figure 13:
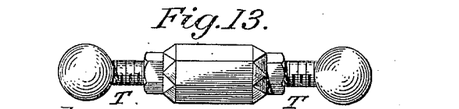
Fig. 13 is a detail view of the adjustable connection that joins the pawl-carrying block and the special rail-lever.
Figure 14:
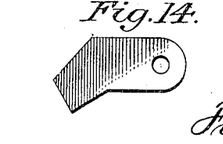
Fig. 14 is a detail view of the sliding-pawl-block.

Each lever Y is fulcrumed in a bifurcated bracket $26^a$, projected from the slide-plate 26, and includes a pusher portion $26^b$, having an adjustable heel-piece to shorten or lengthen the fulcrum of the lever and an inwardly-extending arm having a roller-head $26^d$, and all the roller-heads $26^d$ are arranged to ride in an annular groove $50^\times$ in a cam-ring $50^a$, bolted to the master-wheel and having a cam portion $50^b$ adapted to successively engage the heads $26^d$ of the series of levers and swing the said heads outwardly in the direction indicated by arrow on Fig. 5, whereby to cause the heel-pieces $26^b$ to engage the toe projections $z'$ on the rails 42 to force the said rails forward one at a time, it being understood that in each complete revolution of the master-wheel nine rails in each of the eleven sections are moved forward, one in each set of rails, causing the outer shield or support to creep forward in sections during the operation of digging.

In operation the cam carried by the master-wheel engages the several rail-levers and moves the rails forward until the lever-heads reach the center of the cam, from whence the heads are led back into the guide circle or groove. The lever $Y'$ has a special function in addition to actuating the rails, it having a pair of slide-blocks S S, connected to the led end thereof, and by means of the rods T having universal-joint connections with the levers and the blocks, as clearly shown in Fig. 6.

Each slide-block S is provided with a ratchet-pawl U, adapted to engage the teeth V in a segmental rail on which the blocks slide. The slide-rail has on each side of the lever $Y'$ when it stands in the center thereof one tooth for every rail in one section of the shield plus one extra tooth on each side, the purpose of such extra teeth being to allow for two revolutions of the master-wheel when the rail-levers do not engage the rails during the time the machine is being pushed forward, as hereinbefore mentioned.

Figure 24:
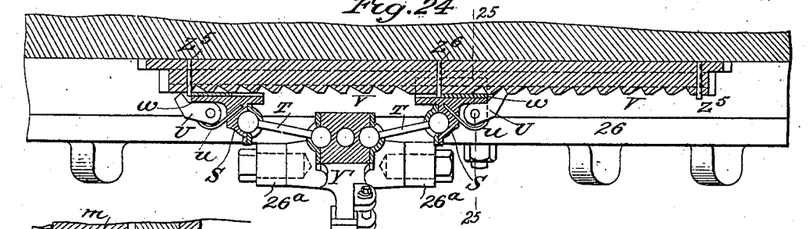
Fig. 24 is a detail horizontal section of the means for shifting the slide members or support 26, taken practically on the line 24 24 on Fig. 6.
Figure 25:
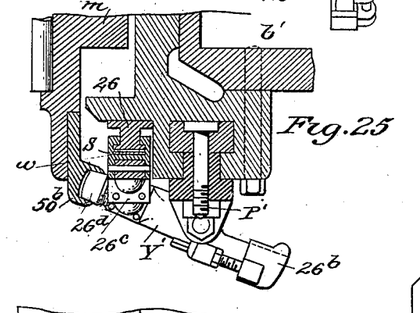
Fig. 25 is a cross-section of said parts on the line 25 25 on Fig. 24.
Figures 26, 27:
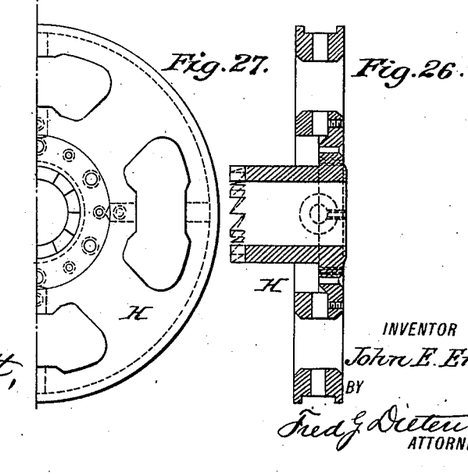
Fig. 26 is a vertical section of the brake-wheel clutch H.
Fig. 27 is a side detail view thereof.
Figure 28:
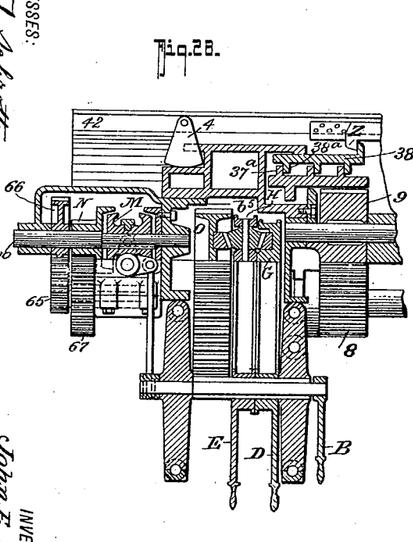
Fig. 28 is a detail section on the line A A on Fig. 2 through the bearing, shaft, and eccentric of levers E, B, and D and friction-clutch that operate the cutting devices.
Figures 29, 30:
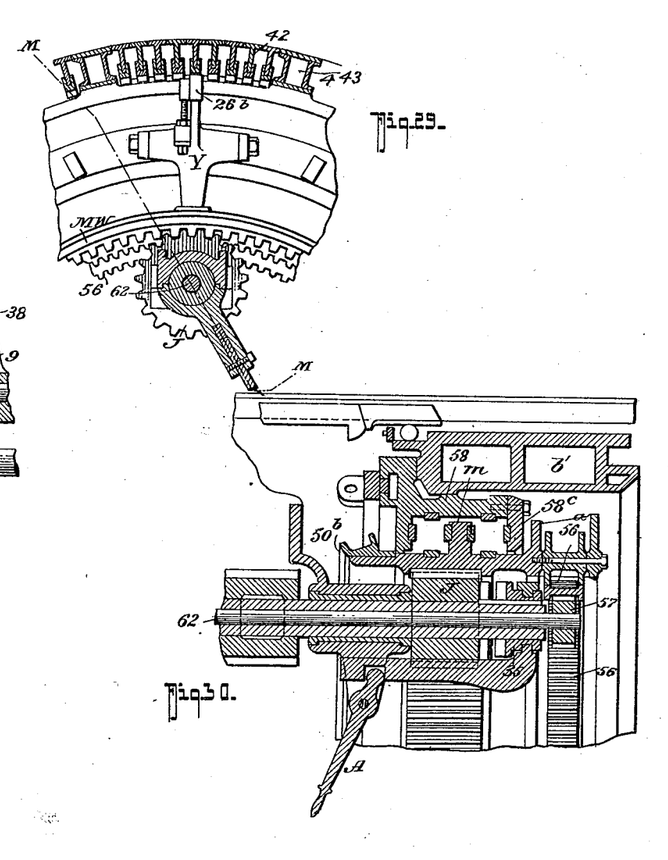
Fig. 29 is a detail section on the line B B on Fig. 1.
Fig. 30 is a detail section on the lines M M on Fig. 29 and Fig. 2.
Figure 31:
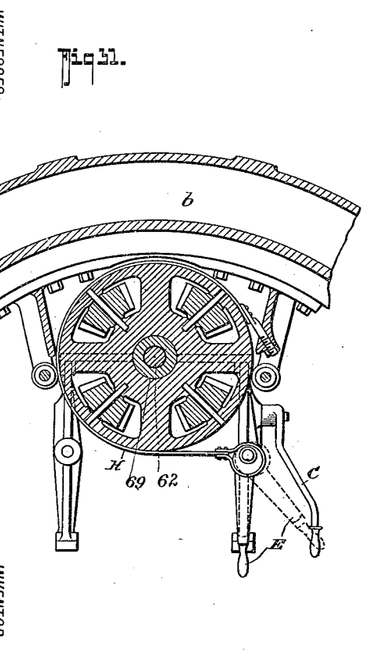
Fig. 31 is a section on lines E E of Fig. 1.
Figures 32, 33:
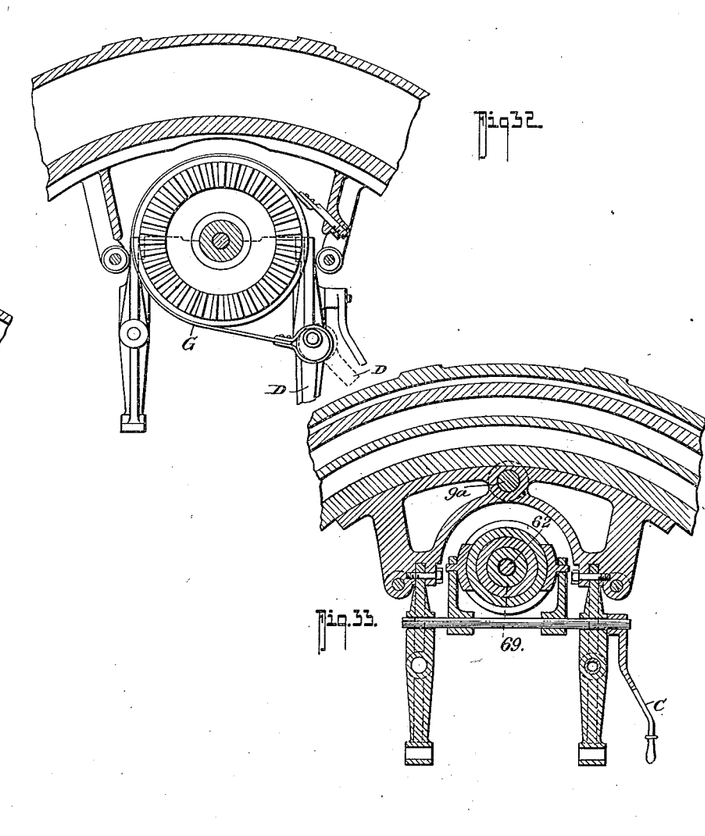
Fig. 32 is a section on lines D D on Fig. 1.
Fig. 33 is a section on lines C C of Fig. 1.

When the special lever $Y'$, which is engaged by the cam and moves one rail forward in each revolution, the same as do the levers Y, reaches the center of the cam, the connecting-rods are at an angle, which shortens the distance between the sliding blocks S and the center of the lever $Y'$, and hence one of the pawls in the slide-blocks engages the teeth in the rail V, and as the master-wheel cam forces the head of the lever $Y'$ inward again to the guide-circle it moves the rail-lever support 26 with all the rail-levers a distance sufficient to be in alinement with the next rail in each set, such operation being effected at every complete revolution of the master-wheel until the last one of the rails in each set of rails has been moved, after which the supporting member that carries the several levers Y $Y'$ is moved one step farther, since there is one extra tooth in the rail V at each end, which allows the arm to move in the space beyond the last rail, while the annulus, Fig. 16, is set against the rails to pull the machine forward. After the operation just explained is finished the pawl U, that forced the support 26 forward step by step, is automatically lifted out of engagement with the teeth as the plate $w$, that coöperates therewith, (see Fig. 25,) slidably mounted in the block S, that carries the pawl, comes into contact with a stop-pin $z^6$, carried by the member 26 centrally thereof, which causes the plate $w$ to move under the pawl and lift it out of the teeth and against the tension of a spring $u$. (See Fig. 24.) It should be stated that as one pawl U is thus tripped by the sliding of its coacting plate $w$ the other pawl U as it reaches the outer end of the opposite set of teeth in the plate V has its coacting slide-plate moved into engagement with another stop-pin $z^5$, (one of which is at each end of the plate V,) which causes the said plate $w$ to slide back to allow the spring $u$ of the other pawl U to move said pawl into position to come into action to move the support 26 in the opposite direction to that in which it had just traveled.

Figure 4:
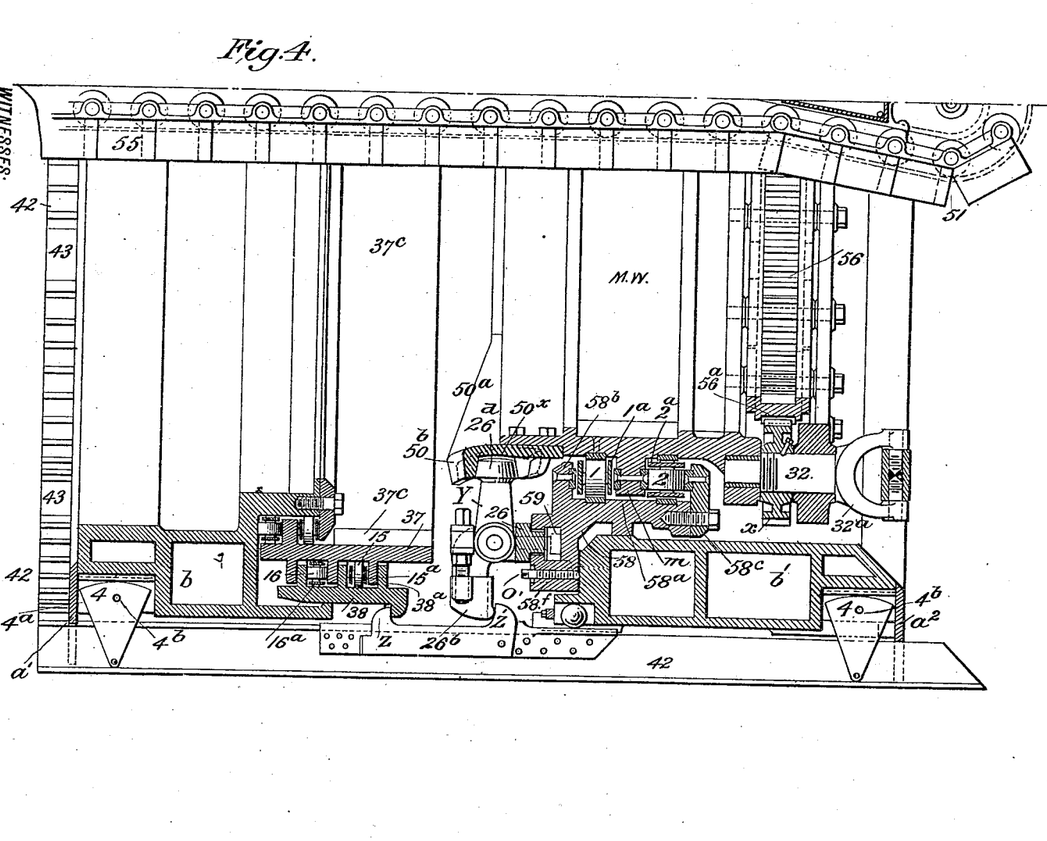
Fig. 4 is a similar view of the lower part of said mechanism and especially illustrating the digger-actuating mechanism and the rail-shifting lever and the actuating-cam therefor.

The machine is set to work in any direction desired in the following manner: As the bolts P' P' bind the outside roller-bearing to the frame of the machine and the bolts O' are threaded into the flange $58^b$ of the member 58 and extended to bear against the adjacent face of the frame-rest $b'$, (see Fig. 4,) it follows that by loosening the bolts P' P' the digging mechanism can be set to work in the direction that the frame has been separated most by the manipulation of the screws O' P', and by screwing the pusher on the rail-levers Y $Y'$ nearer the fulcrum of said levers the slide movement of the rails on that side is made proportionately to the sweep or thrust of the levers Y, thus providing a simple but effective means for increasing or decreasing the forward thrust of the rails and imparting, as it were, differential slide movements to the entire shield of rails and for sliding one portion farther forward than the others to cause the entire machine to take an upward, downward, or sidewise direction on short curves.

Figure 21:
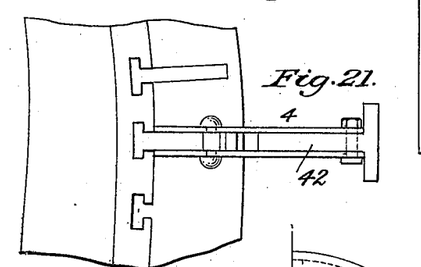
Fig. 21 is a plan view of the same.
Figure 23:
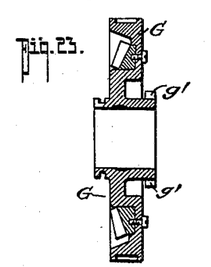
Fig. 23 is a vertical section of the brake-wheel G.

To maintain a proper bearing between the supporting mechanism and the rails during the operation of shifting the rails, and also to prevent binding of the several parts under the ordinary adjustments thereof, rail-bearing members 4 are provided at each end of the rails pivotally secured to the rails and having the inner ends pivotally mounted in sockets $4^a$ in the end-rest frames $b$ $b'$ and formed with stud-rests $4^b$, and the said bearing members have segmental bearing-faces $4^c$, as clearly shown in Figs. 21 and 22.

The conveyer mechanism in my present case may be of any approved construction and, as shown herein, does not materially differ from the form of conveyer mechanism shown in my patent referred to. The chute 50 is secured at the entrant end of the conveyer-frame supported by hangers 51 and $51^a$ on the front and near rest-frame $b$ $b'$, and the said chute 50 receives the dirt from the buckets L L, mounted on the digger-frame in a suitable manner. The hanger 51 (see Fig. 1) also serves as a universal joint or drive-shaft, and for such purpose it is swivelly connected at its upper end of the coupling 51$^d$ on a short shaft 51$^b$, that carries a gear 51$^c$, which meshes with and receives motion from the drive-gear O. The lower end of the hanger-shaft 51 connects with a coupling member 51$^e$ on a shaft mounted on the conveyer-frame and carrying a bevel-pinion 51$^f$, that meshes with a pinion 51$^h$ on the cross-shaft 51$^g$ of the conveyer devices, as clearly shown in Fig. 2. The hanger 51$^a$, that supports the front end of the conveyer, is made fast to the bearing-bracket of the gearing-sustaining frame, as shown, and in the practical application of my machine the rear end of the conveyer is suitably supported on a carriage provided in the tunnel for the car-tracks, in which direction the conveyer in practice extends about forty feet.

55 designates the endless chain of buckets that receive the dirt from chute 50.

From the foregoing, taken in connection with the accompanying drawings, it is believed the complete construction, operation, and advantages of my present invention will be readily understood by those skilled in the art to which it appertains.

One of the essential advantages of my present invention is the simple, effective, and conveniently-controlled means for directing the course of the tunnel-cut, the manner in which the parts are assembled to reduce the frictional resistance to the minimum, the quick and positive manner for controlling the action of the digger-operating mechanism, and for feeding the digger mechanism for moving the same forward on the shield-rails without interfering with the work behind.

Having thus described my invention, what I claim, and desire to secure by Letters Patent, is—

1. In a tunneling-machine of the character described; a shield for sustaining the digger mechanism comprising a plurality of series of rails, each rail in each series being held for longitudinal movement independent of the others, and an automatic means mounted on the shield for imparting longitudinal movement to the shield-rails at predetermined times.

2. In a tunneling-machine of the character described, in combination with a shield formed of a circular series of rails, independently movable in a longitudinal direction, a rotary screw-thrust mechanism mounted on and within the shield, a rope-drive-actuated means for operating the screw thrust and a means actuated by the rotary screw thrust for transmitting a longitudinal thrust movement to the rails successively as set forth.

3. In a tunneling-machine of the character described, the combination with the digging mechanism, a supporting-frame therefor; of a shield that surrounds the supporting-frame and carries it, a rotary-screw-thrust mechanism for moving the supporting-frame forward on the shield-rails, and a rope-drive-controlled actuating means for controlling the screw-thrust mechanism substantially as shown and described.

4. In a tunneling-machine of the character described, in combination with the digging mechanism, a supporting-frame therefor, and a rope-drive for actuating the digging mechanism; of a shield formed of a plurality of series of slide-rails, a circular guide at each end of the machine for said rails, and a mechanism controlled by the rope-drive-actuated means for shifting the rails forward one at a time, said mechanism including devices for regulating the thrust movement of each rail as set forth.

5. A tunneling-machine of the character described, in which is included a shield formed of a series of independently-movable rails, a means for imparting a thrust movement successively to the said rails, said means including adjusting devices for regulating the degree of the said thrust movements.

6. In a tunneling-machine of the character described, and in which is included a circular shield formed of a series of independently longitudinally movable rails; a means mounted within and on the shield for imparting a thrust movement successively to the rails, said means including an adjusting means for regulating the degree of said thrust movement, and a rope-drive connected with the said rail-actuating means as specified.

7. In a tunneling-machine as described, a supporting-frame, a digger-plow carried thereon; means for imparting a circular sweep motion to the plow radially in opposite spiral directions, said means including a master-wheel, a rope-drive mechanism geared with said master-wheel, said mechanism including shiftable clutch means and reversing-gears, a stationary screw-thrust ring, and a screw-thrust annulus connected to the supporting-frame, adapted to be thrown into gear with the plow-actuating gearing, whereby to coact with the screw-thrust ring to move the supporting-frame forward, as specified.

8. In a tunneling-machine of the character described; in combination with the shield-rails, the supporting-frame mounted within and on said rails, the digger-actuating mechanism mounted on the supporting-frame, said mechanism including reversing-gears and clutch devices for shifting said gears; a rotary member having an external screw mounted on the supporting-frame and having an internal gear-flange adapted to be thrown into connection with the digger-actuating gearing, and a fixedly-held screw-thrust member that coacts with the external screw on the rotary member, whereby when the said member is rotated the supporting-frame and all the mechanism mounted thereon is fed forward as set forth.

9. In a tunneling-machine of the character described; the combination with the external shields, the external supporting-frame movable bodily within the shield, said frame carrying the digger mechanism and actuating devices therefor, of the swing-supports 4 pivotally mounted on the shields and having studs 4^b, and the slotted bracket members 4^a on the supporting-frames with which the studs 4^b engage substantially as shown and for the purposes described.

10. In a tunneling-machine of the character described; an external shield, movable in the direction of its length, an annular internal screw-feed, fixedly held on the shield, a supporting-frame that carries the digger and digger-operating means, mounted within the shield for longitudinal movement therein, a rotary rim forming a part of and movable with the supporting-frame, said rim having a gear connection with the actuating means and having a screw-annulus that coacts with the fixedly-held screw-rim, all being arranged whereby when the annulus is rotated, it with the supporting-frame and the mechanism thereon is moved forward as set forth.

11. In a tunneling-machine, in combination with the digging mechanism, the shield, an inwardly-projecting screw-annulus, said annulus being fixedly held against the shield from back thrust; a supporting-frame for the digging mechanism, a second screw-annulus rotatably mounted on the said frame and having threads that engage the threads of the other annulus, clutch-gear mechanism coöperatively connected with the digging mechanism adapted under its operative adjustment to move the rotary annulus whereby to cause it to feed forward, said rotary annulus being joined with the supporting-frame to drag it forward with it when motion is applied thereto as set forth.

12. In a tunneling-machine of the character described, the combination with the external shield composed of a series of forwardly-slidable rails, an internally-projecting annular left screw connected to the said shield held from backward movement, a supporting-frame within the shield and movable forwardly independent of the shield, digger mechanism and actuating devices therefor mounted on the frame, a rotary member connected to the supporting-frame having external screw-flanges that engage the left screw-flanges on the shield-engaged annulus, a clutch-gear mechanism coöperatively engaged with the digger-mechanism-actuating devices, for operating the rotary annulus, and a second clutch-gear mechanism connected with the digger-actuating devices for feeding the frame-rails after the frame has been shifted in that direction as set forth.

13. In a tunneling-machine of the character described, in combination with the shield formed of a plurality of series of longitudinal rails, a supporting-frame for the digger devices, and the actuating mechanism mounted thereon, said actuating mechanism including a master drive-wheel; of a series of pivoted levers, one for each series of rails, a cam on the master-wheel for actuating said levers, and means automatically controlled by the rocking movement of one of the said levers for automatically shifting all of the levers at predetermined times, whereby to set them to successively engage the several rails in each series, as set forth.

14. In a tunneling-machine of the character described, the combination with the digging mechanism, a supporting-frame therefor and actuating devices for the said mechanism mounted on the frame, said devices including a master-gear; of a surrounding shield formed of a plurality of series of slide-rails, a series of rocking levers one for each series of rails, an annular member on which all of the levers are fulcrumed, said member being mounted on the supporting-frame for a limited transverse reciprocation on the frame, a cam on the master-wheel for successively engaging the several levers, the latter being arranged to engage the slide-rails and push them forward when rocked by the cam, and means controlled by the forward impulse of one of the levers to shift the lever-carrying member for the purposes described.

15. In a machine of the character described, the combination with the shield, the front and the rear annular frame-sections, the rope-drive mechanism fixedly mounted on the rear frame-section, a supplemental annular frame 58 tiltably mounted on the front frame-section, the digger mechanism including a master drive-gear rotatably mounted on the supplemental frame 58 and the clutch-controlled reverse-gear mechanism mounted on the rear frame-section and coöperatively connected with the rope-drive mechanism and the master drive-wheel of the digging devices as set forth.

16. In a tunneling-machine of the character described, a series of rail-pusher levers pivotally mounted and having heel portions for engaging the rails, means for rocking the levers to impart a forward thrust to the rails and means on the levers for regulating the length of the heel portions of the said levers as specified.

17. In a tunneling-machine of the character described, the combination with the supporting-frame, the digger mechanism, the actuating means therefor, the shield formed of a series of longitudinally-slidable rails; of a series of thrust-levers, a ring on which all the levers are pivotally mounted, said ring being mounted on the supporting-frame for a rotary reciprocal slide motion, a pair of oppositely-disposed racks on said ring, a pair of opposite-disposed pawls, link members that connect said pawls with one of the levers and adapted under the thrust swing of said lever to engage with the racks, a trip for releasing said pawls from racks when they reach the last tooth of said racks, and a cam device on the digger-actuating means for actuating the levers, as set forth.

JOHN E. ENNIS.

Witnesses:
C. E. EDWARDS,
ADRIEN CLARE.